United States Patent
Fine et al.

(10) Patent No.: US 11,651,543 B2
(45) Date of Patent: May 16, 2023

(54) METHOD FOR GENERATING GRAPHIC SURFACES TO BE DISPLAYED ON A SCREEN, RELATED GRAPHICS PROCESSOR

(71) Applicant: THALES, Courbevoie (FR)

(72) Inventors: Alexandre Fine, Mérignac (FR); Nicolas Levasseur, Mérignac (FR); Yannik Breuil, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/145,857

(22) Filed: Jan. 11, 2021

(65) Prior Publication Data

US 2021/0217221 A1 Jul. 15, 2021

(30) Foreign Application Priority Data

Jan. 15, 2020 (FR) ...................... 20 00365

(51) Int. Cl.
*G06T 15/04* (2011.01)
*G06T 15/00* (2011.01)

(52) U.S. Cl.
CPC ............ *G06T 15/04* (2013.01); *G06T 15/005* (2013.01)

(58) Field of Classification Search
CPC .............................. G06T 15/04; G06T 15/005
See application file for complete search history.

(56) References Cited

U.S. PATENT DOCUMENTS

| 6,980,216 | B2 | 12/2005 | Hancock et al. |
| 2005/0162434 | A1 | 7/2005 | Hancock et al. |
| 2009/0153571 | A1* | 6/2009 | Crow ................ G06F 9/4812 345/506 |
| 2016/0179714 | A1* | 6/2016 | Acharya ............ G06F 12/023 711/158 |
| 2017/0083998 | A1* | 3/2017 | Acharya ................ G06T 1/60 |

FOREIGN PATENT DOCUMENTS

FR 2 908 916 B1 4/2009

OTHER PUBLICATIONS

Communication from the French Patent Office in counterpart French Application No. 20 00365, dated Sep. 16, 2020.
French Search Report from the French Patent Office in counterpart French Application No. 20 00365, dated Sep. 4, 2020.

* cited by examiner

*Primary Examiner* — Michelle Chin
(74) *Attorney, Agent, or Firm* — ArentFox Schiff LLP

(57) ABSTRACT

This method for generating graphic surfaces to be displayed on a screen is implemented by a graphics processor and comprises:
- generating a first graphic surface to be displayed on the screen;
- switching between generating the first graphic surface and generating a second graphic surface;
- generating the second graphic surface to be displayed on the screen;
- the switching including saving a graphic execution context of the first graphic surface; and if the generation of the second graphic surface had been interrupted during a preceding switch with the generation of another graphic surface, restoring a graphic execution context of the second graphic surface, the restored context having been saved during said preceding switch.

12 Claims, 3 Drawing Sheets

METHOD FOR GENERATING GRAPHIC SURFACES TO BE DISPLAYED ON A SCREEN, RELATED GRAPHICS PROCESSOR

CROSS-REFERENCE TO RELATED APPLICATIONS

This application is a U.S. non-provisional application claiming the benefit of French Application No. 20 00365, filed on Jan. 15, 2020, which is incorporated herein by reference in its entirety.

FIELD

The present invention relates to a method for generating graphic surfaces to be displayed on a screen, the method being implemented by a graphics processor.

The invention also relates to such a graphics processor able to generate graphic surfaces to be displayed on the screen.

The invention also relates to a platform comprising such a graphics processor and a central processor, connected to the graphics processor.

The invention relates to the field of data display systems, preferably suitable for being embedded in an aircraft, in particular in an aircraft cockpit.

The invention in particular relates to the field of graphics processors included in these display systems, these graphics processors also being called GPU (Graphic Processing Unit). Such graphics processors are typically made in the form of one or several dedicated integrated circuits, such as one or several ASIC (Application-Specific Integrated Circuit).

Each graphics processor is generally connected to a central processor, in particular a multicore processor, to form a platform, the central processor generally being called CPU (Central Processing Unit).

BACKGROUND

On small screens, or screens with low resolution, only one application is displayed on the screen. An application refers to the calculation, by the central processor CPU, of symbologies from data coming from databases and sensors of the aircraft, the graphics processor GPU then being able to convert, into video signals, the application(s) coming from the central processor CPU, that is to say, the symbologies calculated by the central processor CPU.

With the increase in screen sizes, several applications can share the screen and therefore manage simultaneous displays, each application then corresponding to one or several graphic surfaces. In particular, in an avionics context, avionics computer platforms are also intended to run several applications at once, especially when these platforms include multicore computers. These graphic surfaces can be superimposed with transparency or can be juxtaposed. Thus, in the aeronautics field, critical piloting information is for example to be displayed at the same time as a digital map of the overflown terrain, information which is not considered to be critical inasmuch as it is not of a nature to imperil the safety of the aircraft. These applications are for example processed by a common GPU graphics processor, and it is then appropriate to manage the access by the various applications to the graphics processor GPU while taking the various priority levels into account.

Document U.S. Pat. No. 6,980,216 then teaches allocating each application a provisional time duration and checking, when the application is in progress, whether this duration has been reached or exceeded. Such a method then offers time segregation of the applications within the central processor CPU, and includes an execution time prediction on the GPU taking various parameters into account. However, this prediction is costly in terms of performance and necessary resources, since it requires a learning phase in order to establish a graphic command performance database.

Also known from document FR 2 908 916 B1 is a central processor CPU making it possible to process at least two graphics applications at the same time, a graphics processor GPU making it possible to put the graphics applications coming from the central processor CPU in the form of video signals, and a memory of the central processor CPU shared between the graphics applications, each application having a specific storage area in said memory. The central processor CPU further comprises a graphics manager able to detect a violation of the segregation of the applications in their respective display window, an excess in processing time of each application, or a violation of specific storage areas.

However, the segregation of the display of the graphics applications is not always optimal.

SUMMARY

The aim of the invention is then to propose a method for generating graphic surfaces to be displayed on a screen, and an associated graphics processor, making it possible to improve the partitioning of the display of the graphic surfaces.

To this end, the invention relates to a method for generating graphic surfaces to be displayed on a screen, the method being implemented by a graphics processor and comprising the following steps:
  generating a first graphic surface to be displayed on the screen;
  switching between generating the first graphic surface and generating a second graphic surface;
  generating the second graphic surface to be displayed on the screen;
  the switching step comprising:
    saving a graphic execution context of the first graphic surface; and
    if the generation of the second graphic surface had been interrupted during a preceding switch with the generation of another graphic surface, restoring a graphic execution context of the second graphic surface, the restored context having been saved during said preceding switch.

Thus, through the switching step—between the generation of a first graphic surface and the generation of a second graphic surface—including saving a graphic execution context of the first graphic surface, then restoring, for the second graphic surface, a previously saved graphic execution context, the generating method according to the invention makes it possible to offer partitioning of the display of the graphic surfaces for the graphics processor GPU.

Preferably, associating a set of graphic surface(s) and graphic execution context(s) with each respective software application makes it possible to allocate resources of the graphics processor GPU, in order to obtain even safer partitioning of the display of the graphic surfaces.

Also preferably, associated with each software application is a respective overall limit duration for generating the set of graphic surface(s) of said application. If the overall limit duration is reached for a respective application during the generation of a graphic surface of said application, then the generation of this graphic surface is interrupted, to switch to the generation of a graphic surface of another software application, which also makes it possible to further improve the partitioning of the display of the graphic surfaces, and generally of the resources of the graphics processor, including its memory.

According to other advantageous aspects of the invention, the generating method comprises one or more of the following features, considered alone or according to all technically possible combinations:

the graphic surfaces are generated for several distinct software applications, and each respective software application is associated with a set of graphic surface(s) and graphic execution context(s);

said sets preferably being disjoint from one another;

each set including a list of attribute(s) for each graphic surface;

a respective overall limit duration is associated with the generation of the set of graphic surface(s) of each software application, and if the overall limit duration is reached for a respective application during a step for generating a current graphic surface of the set of graphic surface(s) of said respective application, then said step for generating the current graphic surface is interrupted, and the switching step is done before the step for generating a subsequent graphic surface of a set of graphic surface(s) of another software application;

a respective unitary limit duration is associated with each step for generating a respective graphic surface, and if the unitary limit duration for a respective graphic surface is reached, then the step for generating the respective graphic surface is interrupted, and the switching step is done before the step for generating a subsequent graphic surface;

each graphic surface is associated with a respective generating frequency, and the value of the unitary limit duration of a respective graphic surface depends on the generating frequency of said graphic surface;

a maximum refresh time is associated with each respective graphic surface, the value of the maximum refresh time depending on the dimensions of the respective graphic surface, and if the maximum refresh time is reached for a respective graphic surface during a generating step of said respective graphic surface, then the generating step of the respective graphic surface is interrupted, and the saving of a graphic execution context of said respective graphic surface is not done during the subsequent switching step;

the method preferably further comprises a step for emitting an error signal if the maximum refresh time is reached for a respective graphic surface during a generating step of said respective graphic surface;

each generating step of a respective graphic surface further includes incrementing a respective time counter for each graphic surface, and the switching step further includes saving the value of the time counter of the graphic surface whose graphic execution context is saved;

the method further comprises a step for verifying the processing of trace commands received at the input of the graphics processor, and if an incorrect processing of a trace command is detected, then the step for generating the graphic surface corresponding to said trace command is interrupted, and the saving of a graphic execution context of the graphic surface corresponding to said trace command is not done during the subsequent switching step;

the graphic execution context preferably being positioned in an invalid state, for a later reset;

during the switching step, the graphic execution context saved for the respective graphic surface includes at least one information item chosen from the group consisting of:

a rendering library information item, such as a color, a line width, a texture, a texture attribute, a list attribute and an alphanumeric attribute;

an information item on a memory location and a memory size of graphic command(s) to be executed for the respective graphic surface; and an information item of a hardware resource of the graphics processor, such as a memory zone, accessible for the graphic execution of the respective graphic surface.

The invention also relates to a graphics processor able to generate graphic surfaces to be displayed on a screen, the graphics processor comprising:

a generating module configured to generate respective graphic surfaces to be displayed on the screen;

a switching module configured to switch between generating a first graphic surface and generating a second graphic surface;

the switching module being configured to save a graphic execution context of the first graphic surface; and if the generation of the second graphic surface had been interrupted during a preceding switch with the generation of another graphic surface, then configured to restore a graphic execution context of the second graphic surface, the restored context having been saved during said preceding switch.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
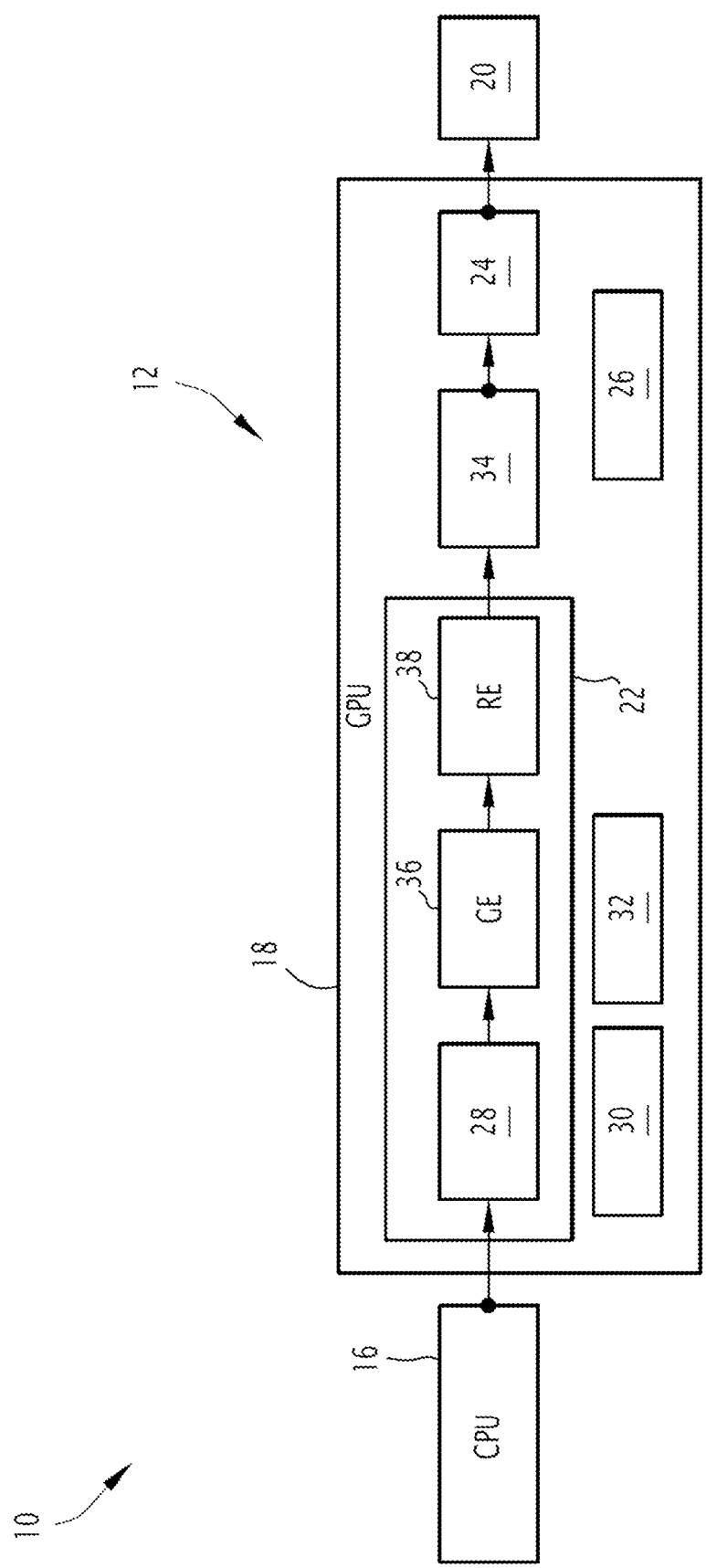
FIG. 1 is a schematic illustration of an avionics system according to the invention, intended to be embedded in an aircraft and comprising an avionics platform, the platform including a central processing unit and a graphics processor connected to the central processor, as well as a display screen.

In FIG. 1, an avionics system 10, intended to be embedded in an aircraft, not shown, comprises an avionics platform 12.

The avionics platform 12 comprises a central processing unit (CPU) 16 and a graphics processor 18, also called graphic processing unit (GPU), the graphics processor 18 being connected to the central processing unit 16.

In addition, the platform 12 comprises a display screen 20, for example connected to the graphics processor 18.

The central processing unit 16 is known in itself. The central processor 16 is for example a multicore central processor. In a variant, the central processor 16 is for example a single-core central processor.

The graphics processor 18 comprises a module 22 for generating respective graphic surfaces to be displayed on the display screen 20, each graphic surface forming a set of pixel(s) to be displayed and a module 24 for displaying each graphic surface on the display screen 20, the display module 24 being connected to the generating module 22.

The graphics processor 18 further comprises a data storage memory 26 and a module 28 for switching between respective generations of a corresponding graphic surface. The switching module 28 is for example integrated into the generating module 22, as shown in FIG. 1. In a variant, the switching module 28 is connected at the input of the generating module 22.

As an optional addition, the graphics processor 18 comprises a module 30 for emitting an error signal if a maximum refresh time associated with a respective graphic surface is reached during the generation of said respective graphic surface. In the example of FIG. 1, the emission module 30 is distinct from the generating module 22. In a variant, the emission module 30 is, similarly to the switching module 28 in FIG. 1, integrated into the generating module 22.

Also as an optional addition, the graphics processor 18 comprises a module 32 for verifying the processing of trace commands received at the input of the graphics processor 18. In the example of FIG. 1, the verification module 32 is distinct from the generating module 22. In a variant, the verification module 32 is, similarly to the switching module 28 in FIG. 1, integrated into the generating module 22.

According to a variant, the switching module 28, the emission module 30 and the verification module 32 are then integrated into the generating module 22.

In a complementary manner, the graphics processor 18 comprises a module 34 for composing an image from the graphic surface(s) generated by the generating module 22, the display module 24 then being able to display the image composed by the composition module 34.

The generating module 22 is configured to generate at least one respective graphic surface to be displayed on the display screen 20. In particular, the generating module 22 is configured to generate several respective graphic surfaces, one after the other. The graphic surfaces are generated for several distinct software applications, and each respective software application is associated with a set of graphic surface(s) and graphic execution context(s). These sets of graphic surface(s) and graphic execution context(s) are preferably distinct from one another, so as to obtain safer partitioning between distinct software applications. In a complementary manner, each set includes a list of attribute(s) for each graphic surface.

In the following of the description, in case of switching between generating a current graphic surface and generating a subsequent graphic surface, the current graphic surface will also be called first graphic surface S1, and the subsequent graphic surface will also be called second graphic surface S2. The generating module 22 is then configured to generate the first graphic surface S1, then to generate the second graphic surface S2, and in case of interruption of the generation of the first graphic surface S1, the switching module 28 is configured to switch between generating the first graphic surface S1 and generating the second graphic surface S2.

"Graphic surface" refers to a pixel storage area, which may or may not be intended for display, in which the graphics creation chain performs a trace operation. The skilled person will then understand that the graphic surface for example corresponds to the "Drawing Surface," defined in the EGL standard, in particular in the document titled "OpenGL® ES Native Platform Graphics Interface," version 1.0 dated July 2003 and subsequent one(s).

"Graphic execution context" refers to a collection of states parameterizing the operation of the graphics creation chain, for example definitions of geometric transformation laws, trace color values, or erasure values, or identifications of textures to be applied. The skilled person will then understand that the graphic execution context for example corresponds to the "Rendering Context," also defined in the aforementioned EGL standard.

"List of attribute(s)" refers to information defining a logic representation from which at least one graphic surface will be generated. The list of attribute(s) for example includes information defining a virtual frame, such as the position and/or the dimensions of said frame, inside which the respective graphic surface will be generated. The skilled person will then understand that the list of attribute(s) for example corresponds to a window, also called "Native Window," also defined in the aforementioned EGL standard.

As an optional addition, the generating module 22 is configured to associate a respective overall limit duration with the generation of the set of graphic surface(s) of each software application. According to this optional addition, if the overall limit duration is reached for a respective application during the generation of a graphic surface of the set of graphic surface(s) of said respective application, then the generating module 22 is further configured to interrupt the generation of the current graphic surface for which this overall limit duration is reached.

As an optional addition, the generating module 22 is configured to associate a respective overall limit duration with the generation of the set of graphic surface(s) of each software application. According to this optional addition, the generating module 22 is then configured, if the unitary limit duration is reached for a respective graphic surface, to interrupt the generation of said respective graphic surface.

According to this optional addition, each graphic surface is further associated with a respective generating frequency, and the value of the unitary limit duration of a respective graphic surface then depends on generating frequency. The value of the unitary limit duration of a respective graphic surface is preferably less than or equal to the inverse of the generating frequency of said graphic surface.

As an optional addition or in a variant, a maximum refresh time is associated with each respective graphic surface. The value of the maximum refresh time for example depends on the dimensions of the respective graphic surface. The generating module 22 is then configured, if the maximum refresh time is reached during the generation of a respective graphic surface, to interrupt said generation of the respective graphic surface.

As another optional addition, the generating module 22 is further configured to increment a respective time counter for each graphic surface. According to this optional addition, the generating module 22 is preferably configured to reset the respective time counter upon each new generation of a respective graphic surface, that is to say, upon each beginning of a new generation of a respective graphic surface. Also in a complementary manner, if the generation of a respective graphic surface is interrupted, the switching module 28 is configured to save the value of the time counter of the graphic surface whose generation is interrupted, and the generating module 22 is then configured, during a subsequent resumption of said generation, to again increment the time counter associated with said graphic surface from the value saved during the interruption, that is to say, to resume the incrementation of the time counter at the value at which it had been stopped at the time of the interruption.

The generating module 22 for example includes a geometric engine 36 able to generate at least one group of geometric primitive(s) and a rendering engine 38 able to convert each group of geometric primitive(s) into a respective graphic surface. The geometric engine 36 is also called GE, and the rendering engine 38 is also called RE (which may also stand for Raster Engine).

The generating module 22, and as an optional addition the composition module 34, form a graphic creation chain of a respective image, which may be displayed on the screen 20 by the display module 24. The graphic creation chain is also called graphic pipeline.

The display module 24 is configured to generally display each graphic surface on the screen 20, in particular to display each image on the screen 20.

As an optional addition, the display module 24 is also configured to mix a respective image with a video, for example stored in the storage memory 26, then to display the mix of the image and the video on the display screen 20.

The memory 26 is connected to each of the memories of the graphics processor 18, in particular to the generating module 22, to the display module 24 and to the switching module 28, as well as, by way of optional addition, to the emission module 30, to the verification module 32 and to the composition module 34.

The switching module 28 is configured to switch between generating the first graphic surface S1 and generating the second graphic surface S2. According to the invention, the switching module 28 is further configured to save, during this switching, a graphic execution context CTX1 of the first graphic surface S1. Furthermore, if the generation of the second graphic surface S2 had been interrupted during a preceding switch with the generation of another graphic surface, the switching module 28 is further configured to restore a graphic execution context CTX2 of the second graphic surface S2, the restoration being done after saving the graphic execution context CTX1 of the first graphic surface S1, the restored context CTX2 having been saved during said preceding switch.

The graphic execution context CTX1, CTX2 saved for the respective graphic surface S1, S2 for example includes at least one information item chosen from the group consisting of:
- a rendering library information item, such as a color, a line width, a texture, a texture attribute, a list attribute and an alphanumeric attribute;
- an information item on a memory location and a memory size of graphic command(s) to be executed for the respective graphic surface S1, S2; and
- an information item of a hardware resource of the graphics processor 18, such as a memory zone, that is to say, a zone of the memory 26, accessible for the graphic execution of the respective graphic surface S1, S2.

The graphic execution context CTX1, CTX2 saved for the respective graphic surface S1, S2 for example preferably includes each of the information items from the aforementioned group.

The skilled person will then understand that aside from saving the graphic execution context CTX1, CTX2 used to generate the respective graphic surface S1, S2, each graphic surface S1, S2 being generated is in turn saved during a respective switch. This saving of the respective graphic surface S1, S2 being generated is, for example, done via a save, at the time of the switch, of the state of the memory containing said graphic surface S1, S2, also called pixel memory.

Furthermore, as previously indicated, each respective software application is associated with a set of graphic surface(s) and graphic execution context(s), in which the graphic surface(s) are distinct objects from the graphic execution context(s). The skilled person will then observe that, throughout the entire disclosure, a graphic execution context of a respective graphic surface more specifically designates a graphic execution context used to generate said respective graphic surface.

When, as another optional addition, the generating module 22 is configured to increment a respective time counter for each graphic surface, the switching module 28 is further configured to save the value of the time counter of the graphic surface whose graphic execution context is saved during switching.

When, as an optional addition, the overall limit duration is reached for a respective application during the generation of a current graphic surface of the set of graphic surface(s) of said respective application, and the generation of said current graphic surface is interrupted by the generating module 22, the switching module 28 is configured to perform the switching of the generation of said current graphic surface, in particular the saving of the graphic execution context of said current graphic surface, before generating a subsequent graphic surface of a set of graphic surface(s) of another software application. The skilled person will further understand that if the subsequent graphic surface had been subject to a preceding interruption, the switching module 28 is configured, at the end of the switching of the current graphic surface, to restore the graphic execution context of the subsequent graphic surface, the latter having been saved during the preceding interruption of the subsequent graphic surface.

Similarly, when, as an optional addition, the unitary limit duration for a respective graphic surface is reached, and the generation of said respective graphic surface is interrupted by the generating module 22, the switching module 28 is further configured to perform the switching of the generation of said respective graphic surface, in particular the saving of the graphic execution context of said respective graphic surface, toward the generation of the subsequent graphic surface. Here again, if the generation of the subsequent graphic surface had previously been interrupted with saving of the graphic execution context of the subsequent graphic surface during this interruption, the switching module 28 is further configured, prior to resuming the generation of the subsequent graphic surface, to restore said graphic execution context of the subsequent graphic surface.

The skilled person will also observe that when, as an optional addition, the maximum refresh time is reached for a respective graphic surface during the generation of said respective graphic surface, and the generation of said respective graphic surface is interrupted by the generating module 22, then no saving of a graphic execution context of said respective graphic surface is done by the switching module 28 during the subsequent switching. Indeed, given that the maximum refresh time is reached for the corresponding graphic surface, the generation of said graphic surface will not be resumed later, and it is then not necessary to save the graphic execution context for said surface whose generation was in progress when the maximum refresh time was reached.

Similarly, when, as an optional addition, incorrect processing of a trace command is detected by the verification module 32, and the generation of the graphic surface corresponding to said trace command is interrupted by the generating module 22, no save of an execution context of the graphic surface corresponding to said trace command is done by the switching module 28 during the subsequent switching. Indeed, the verification module 32 having detected an incorrect trace command, the generation of said graphic surface will not be resumed later, and it is then not necessary to save the graphic execution context for said graphic surface.

According to this optional addition, the switching module 28 is preferably further configured to position, in an invalid state, the graphic execution context of the graphic surface corresponding to the trace command for which incorrect processing was detected, for a subsequent reset of the graphic execution context for said graphic surface. Also preferably, during an upcoming switching between the generation of a current graphic surface and the generation of said graphic surface for which a trace command with incorrect processing had been detected, the switching module 28 is further configured to reset the graphic execution context before the switching to the generation of said graphic surface. In other words, the switching module 28 is further configured, in case of detection of a graphic execution context in the invalid state, to reset said graphic execution context before the subsequent switching to the generation of the graphic surface using said graphic execution context.

The emission module 30 is configured to emit a first alert signal if the maximum refresh time is reached for a respective graphic surface during the generation of said respective graphic surface. This first alert signal means that the maximum refresh time has been reached without the generation of the respective graphic surface having been completed, and this first alert signal then makes it possible to indicate an error related to having reached this maximum refresh time, with an incomplete generation of the respective graphic surface.

Also as an optional addition, the emission module 30 is configured to emit a second alert signal if incorrect processing of a trace command has been detected by the verification module 32 and the generation of the graphic surface corresponding to said trace surface has then been interrupted. This second alert signal then makes it possible to indicate an error in the execution of the generation of said graphic surface, with an incorrect trace command.

As an optional addition, the verification module 32 is configured to verify the trace command processing received as input of the graphics processor 18, and is in particular configured to detect and correct processing of a trace command. If the verification module 32 detects such incorrect processing of a trace command, it is then further configured to send the generating module 22 a signal relative to said detection of the incorrect processing, such that the generating module 22 interrupts the generation of the graphic surface corresponding to said trace command for which incorrect processing has been detected.

The composition module 34 is configured to compose each image from the corresponding graphic surface(s), in particular by positioning said graphic surface(s), for example relative to one another, and by superimposing them if applicable.

The geometric engine 36, or GE, is configured to generate at least one group of geometric primitive(s), that is to say, to generate a vector image portion.

The rendering engine 38 is then configured to convert each group of geometric primitive(s) into a respective graphic surface, that is to say, to convert the vector image portion corresponding to the group of geometric primitive(s) into a matrix image portion corresponding to said graphic surface. This conversion done by the rendering engine 38 is also called rasterization.

Figure 2:
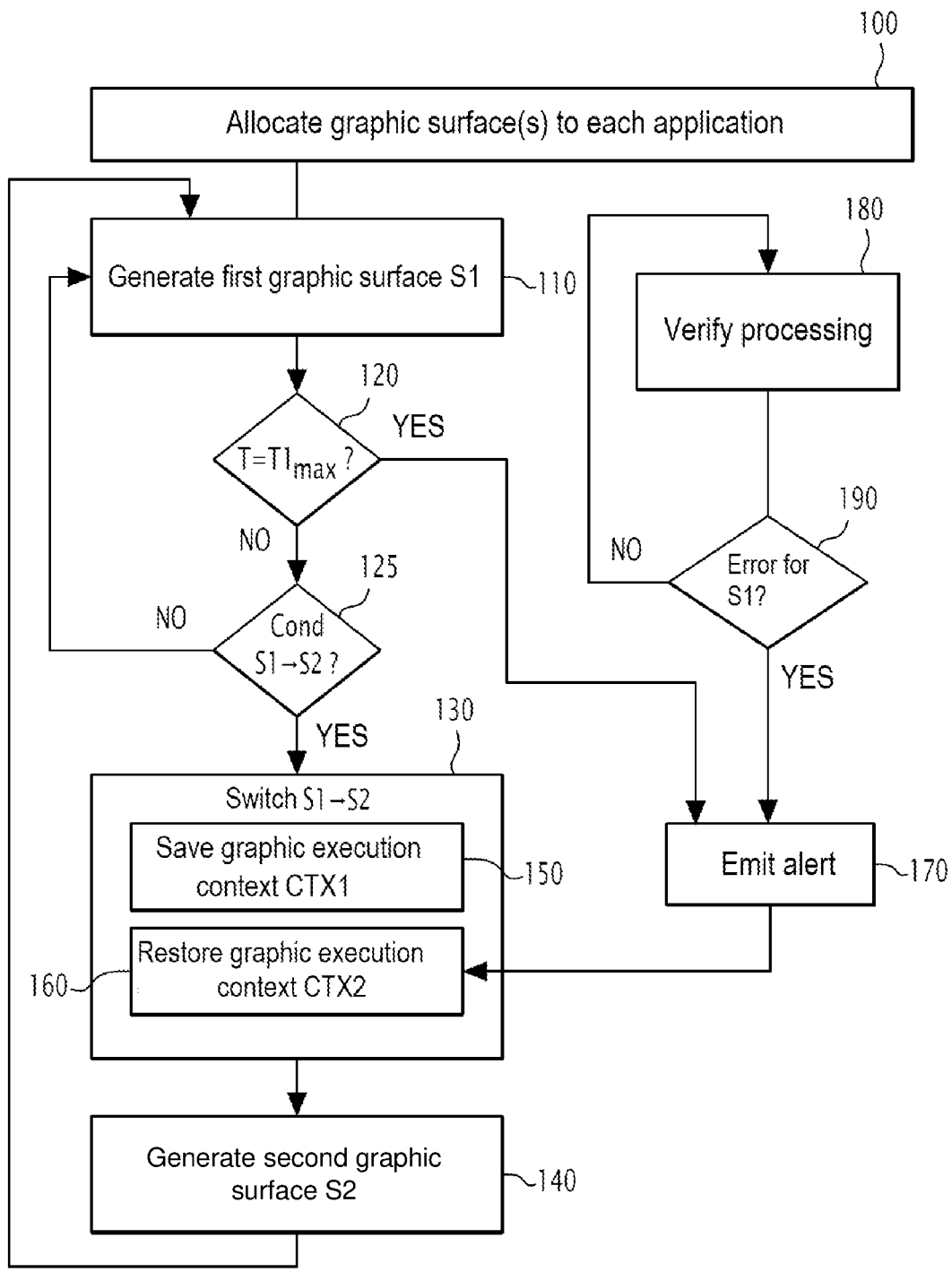
FIG. 2 is a flowchart of a method, according to the invention, for generating graphic surfaces to be displayed on the screen, the method being carried out by the graphics processor of FIG. 1.

The operation of the avionics system 10 according to the invention, and in particular of the graphics processor 18, will now be explained using FIG. 2, showing a flowchart of a method for displaying pixels on the screen 20, and in particular a method for generating graphic surfaces, implemented by the graphics processor 18.

Figure 3:
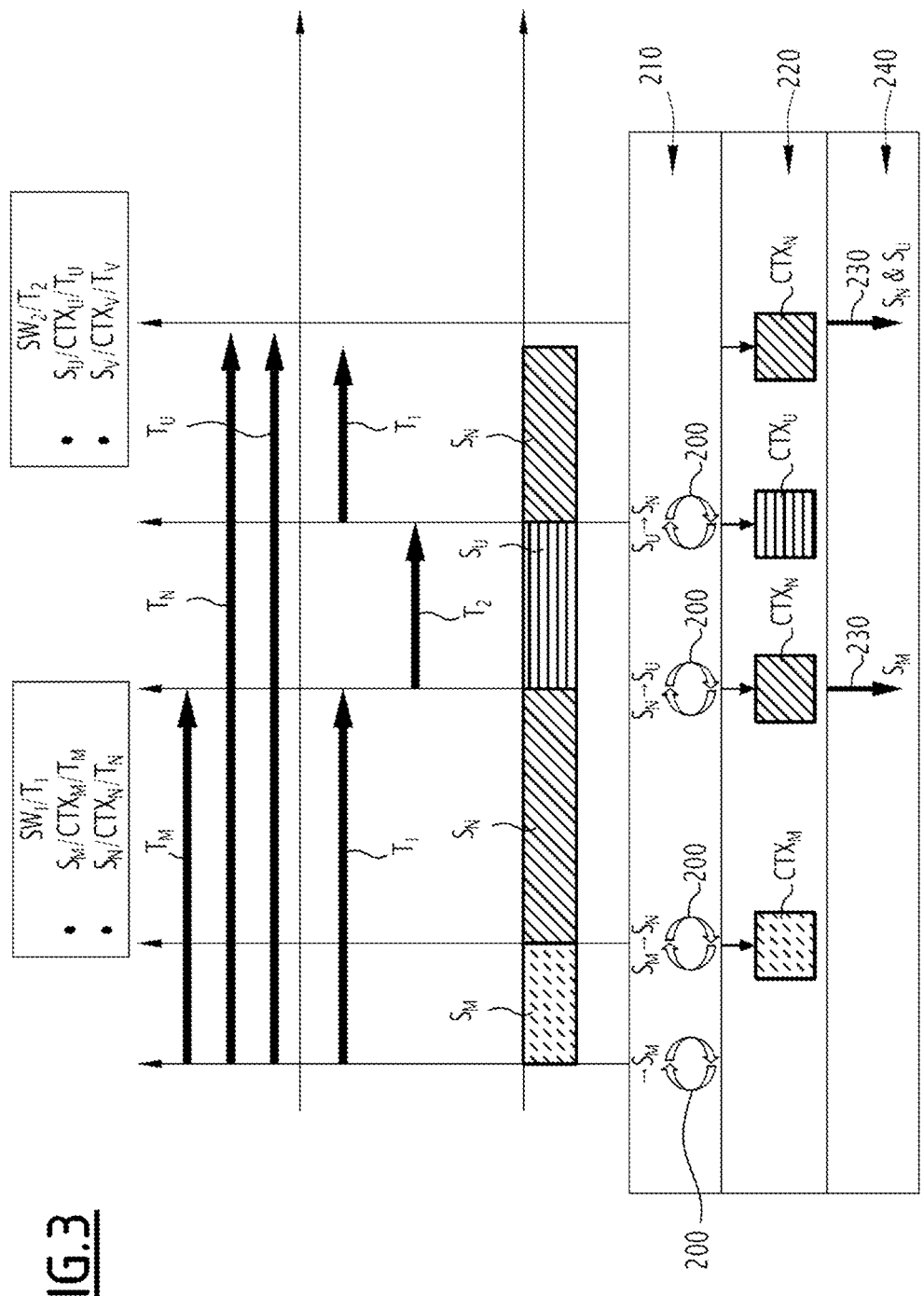
FIG. 3 is a schematic timing diagram showing graphic surface generations and switches between graphic surface generations.

The operation of the avionics system 10 according to the invention, and in particular of the graphics processor 18, will now be explained using FIG. 2, showing a flowchart of a method for displaying pixels on the screen 20, and in particular a method for generating graphic surfaces, implemented by the graphics processor 18; as well as using FIG. 3 showing a schematic timing diagram illustrating different successive generations of graphic surfaces, as well as respective switching operations between generations of graphic surfaces.

During an initial step 100, the graphics processor 18 allocates, for example via its generating module 22, a set of graphic surface(s) and graphic execution context(s) to each respective software application for which information is to be displayed on the display screen 20.

In the example of FIG. 3, the generating module 22 thus allocates, to a first software application $SW_1$, having a first overall limit duration $T_1$, a first set including a graphic surface $S_M$ with an associated graphic execution context $CTX_M$ and unitary limit duration $T_M$, as well as another graphic surface $S_N$ with an associated graphic execution context $CTX_N$ and unitary limit duration $T_N$.

In this example of FIG. 3, the generating module 22 also allocates, to a second software application $SW_2$, distinct from the first software application $SW_1$ and having a second overall limit duration $T_2$, a second set including a graphic surface $S_U$ with an associated graphic execution context $CTX_U$ and unitary limit duration $T_U$, as well as another graphic surface $S_V$ with an associated graphic execution context $CTX_V$ and unitary limit duration $T_V$.

At the end of this initial allocation step 100, the graphics processor 18 goes to the next step 110, during which the generating module 22 generates a first graphic surface S1, then the generating module 22 tests, during the next step 120, whether the maximum refresh time $T1_{MAX}$ for this first graphic surface S1 has been reached, and if not, goes to a next step 125 during which the generating module 22 determines whether a condition requires interrupting the generation of the first graphic surface S1. During this step 125, the generating module 22 in particular verifies whether the overall limit duration for the respective application to which the first graphic surface corresponds has been reached, and also determines whether the respective unitary limit duration associated with the first graphic surface S1 has been reached.

If at least one of said conditions for interrupting the generation of the first graphic surface S1 has been met, that is to say, if the overall limit duration for the software application with which the first graphic surface S1 is associated has been reached and/or if the respective unitary limit duration for the first graphic surface S1 has been reached, then the graphics processor goes to the next step 130 during which the switching module 28 switches between generating the first graphic surface S1 and generating a second graphic surface S2.

Otherwise, that is to say, if no condition for interrupting the generation of the first graphic surface S1 is met, then the graphics processor 18, in particular the generating module 22, continues the generating step 110 of the first graphic surface S1 until the latter is complete or until a condition for interrupting said generation is met.

During the switching step 130, the switching module 28 switches between generating the first graphic surface S1 and generating the second graphic surface S2, then the graphics processor 18 goes to the next step 140, during which the generating module 22 generates the second graphic surface S2. At the end of step 140 for generating the second graphic surface S2, the graphics processor 18 returns to step 110 in order to generate a new graphic surface.

According to the invention, the switching step 130 includes a sub-step 150 for saving the graphic execution context CTX1 of the first graphic surface S1; followed, if the generation of the second graphic surface S2 had been interrupted during preceding switching with the switching of another graphic surface, by a sub-step 160 for restoring the graphic execution context CTX2 of the second graphic surface S2, so that the generation of the second graphic surface S2 is resumed during step 140 with the graphic execution context CTX2 which had previously been saved, that is to say, in the situation in which the graphic execution context CTX2 was during the preceding switching. The saving sub-step 150, and the possible restoring sub-step 160, are carried out by the switching module 28.

As previously indicated, aside from saving the graphic execution context CTX1, CTX2 used to generate the respective graphic surface S1, S2, each graphic surface S1, S2 being generated is in turn saved during a respective switch. This saving of the respective graphic surface S1, S2 is typically done via the saving, at the time of the switch, of the state of the memory containing said graphic surface S1, S2.

During the test step 120, if the maximum refresh time associated with the first graphic surface S1 is reached, that is to say, if the test is positive, then the graphics processor 18 goes directly to step 170 during which the emission module 30 emits the first alert signal, so as to indicate that said maximum refresh time associated with the first graphic surface S1 has been reached without the generation of the first graphic surface S1 having been completed.

If applicable, at the end of the alert emission step 170, the graphics processor 18 goes directly to the sub-step 160 for possibly restoring the graphic execution context CTX2 for the subsequent graphic surface S2 to be generated, and the graphic execution context CTX1 of the first graphic surface S1 is then not saved, as previously explained.

As an optional addition, in parallel with the generation of the first graphic surface S1 during step 110, the graphics processor 18 verifies, during step 180 and via its verification module 32, the processing of trace commands received at its input, and if incorrect processing of a trace command is detected by the verification module 32, then the verification module 32 informs the generating module 22 thereof, which determines whether the trace command for which incorrect processing has been detected corresponds to the graphic execution context CTX1 used for the first graphic surface S1 being generated, and this determination is made during step 190 by the generating module 22. If the incorrect processing of the trace command is detected for the graphic execution context CTX1 used for the first graphic surface S1, then the graphics processor 18 goes to step 170, during which the emission module 30 emits the second alert signal in order to indicate this trace command processing error.

Otherwise, if during this test step 190, the generating module 22 determines that the detected incorrect trace command processing does not relate to the graphic execution context CTX1 used for the first graphic surface S1, that is to say, if the test of step 190 is negative, then the graphics processor 18 returns to step 180, and the verification module 32 continues the verification of the processing of the trace commands received at the input of the graphics processor 18.

Here again, when the second alert is emitted during the emission step 170, the graphics processor 18 goes, at the end of step 170, directly to the restoration sub-step 160, so as to potentially restore the graphic execution context CTX2 for the second graphic surface S2, in the scenario where said graphic execution context CTX2 had been saved beforehand during the preceding switch. In other words, if the generation of the first graphic surface S1 is interrupted due to incorrect processing of a trace command, then the graphic execution context CTX1 for said first graphic surface S1 is not saved during step 130 for switching between the generation of the first graphic surface and the generation of the second graphic surface S2, in particular the saving sub-step 150 is not done.

This operation of the graphics processor 18 according to the invention, with the saving of the graphic execution context and the restoration of a graphic execution context potentially previously saved, during the switching between generations of graphic surfaces, is then illustrated in FIG. 3, where the different switching operations are shown by a symbol 200 with two arrows head to tail, the symbols 200 showing these successive switching operations being grouped together within a first line 210 listing these successive switching operations. A second line 220 groups together the saving of graphic execution contexts done successively, and arrows 230 indicating the completion of the respective graphic surface generation are grouped together within a third line 240.

In this example of FIG. 3, the first graphic surface to be generated is the graphic surface $S_M$ which gives rise, at the end of its generation, to the switching toward the generation of the subsequent graphic surface, namely the graphic surface $S_N$. During the switching between the generation of the graphic surface $S_M$ and that of the graphic surface $S_N$, embodied by the symbol 200 with the mention "$S_M \rightarrow S_N$" above said symbol, the graphic execution context $CTX_M$ associated with said graphic surface $S_M$ is saved by the switching module 28.

The graphic surface $S_N$ is then generated by the generating module 22, and its generation is interrupted upon expiration of the first overall limit duration $T_1$ corresponding to the first software application $SW_1$, the graphic surface $S_N$ being associated with the first software application $SW_1$. This interruption of the generation of the graphic surface $S_N$ then gives rise to switching from the generation of this graphic surface $S_N$ to the generation of the graphic surface $S_U$ associated with the second software application $SW_2$, this switching being identified by the symbol 200 with the mention "$S_N \rightarrow S_U$" above said symbol. During this switching, the switching module 28 then saves the graphic execution context $CTX_N$ associated with the graphic surface $S_N$, as indicated in the second line 220. Furthermore, the unitary limit duration $T_N$ associated with the graphic surface $S_M$ having expired and the graphic surface $S_M$ having been generated, the latter is then ready to be displayed on the screen 20, as indicated by the arrow 230 with the mention "$S_M$" contained in the third line 240.

The generation of the graphic surface $S_U$ is then done, and the latter is interrupted upon expiration of the second overall limit duration $T_2$ corresponding to the second software application $SW_2$, the graphic surface $S_U$ being associated with this second software application $SW_2$. This interruption then gives rise to the switching, done by the switching module 28, from the generation of the graphic surface $S_U$ to that of the graphic surface $S_N$ which had previously been interrupted, this switching being identified by the symbol 200 with the mention "$S_U \rightarrow S_N$" above said symbol. This switching also gives rise to the saving of the graphic execution context $CTX_U$ associated with the graphic surface $S_U$ whose generation is interrupted.

During this switching between the generation of the graphic surface $S_U$ and that of the graphic surface $S_N$, the graphic execution context $CTX_N$—which had previously been saved during the preceding switching between the generation of the graphic surface $S_N$ and that of the graphic surface $S_U$—is further restored by the switching module 28, so that the generation of the graphic surface $S_U$ resumes where it had been interrupted, in particular in the situation, in particular in terms of graphic execution, in which it was found when said generation was interrupted. The expiration of the first overall limit duration $T_1$ then coincides with the expiration of the unitary limit duration $T_N$ and that of the unitary limit duration $T_U$ which are respectively associated with the graphic surfaces $S_N$ and $S_U$, such that the graphic surfaces $S_N$ and $S_U$ are ready to be displayed upon expiration of these aforementioned times, as indicated by the arrow 230 with the mention "$S_N$ & $S_U$" contained in the third line 240. Upon expiration of these times, the graphic execution context $CTX_N$ of the graphic surface $S_N$ is further saved for all useful purposes, as indicated in the second line 220.

Thus, the graphics processor 18 makes it possible, through its switching module 28 performing the switching between the graphic surfaces successively generated by the generating module 22, to offer partitioning of the generation of the graphic surfaces, also called graphic partitioning, between respective software applications $SW_1$, $SW_2$. The skilled person will note that this partitioning is then done directly at the graphics processor 18.

Furthermore, the switching module 28 saving the graphic execution context of the graphic surface whose generation is interrupted, and optionally restoring, that is to say when the graphic execution context had previously been saved, the graphic execution context of the graphic surface toward which the generation will be switched, ultimately makes it possible to have continuity in the generation of the graphic surface, even if the latter is interrupted at a given instant.

The skilled person will also observe that when the interruption of the generation of the graphic surface is due to an error, such as reaching the maximum refresh time and/or detecting incorrect processing of a trace command, the graphic execution context of the graphic surface for which the generation has caused an error is not saved by the switching module 28, given that the incorrect generation of said graphic surface will not be resumed later.

Furthermore, when each respective software application $SW_1$, $SW_2$ has an associated set of graphic surface(s) and graphic execution context(s), for example during the initial allocation step 100, the graphics processor 18 then makes it possible to obtain even more robust partitioning, due to this distinction between sets and in particular this separation between graphic execution contexts.

Furthermore, having a respective generation frequency associated with each graphic surface, and/or a respective unitary limit duration for each generation of a respective graphic surface, makes it possible to perform a display with multiple frequencies, and then to optimize the display of the information on the screen 20.

The skilled person will then understand that, in this case, the most important information, such as information associated with the security of a flight of the aircraft embedding the avionics system 10 according to the invention, is refreshed at a higher frequency than the less important information. In other words, the display of this most important information is updated more regularly than that of the less important information.

Allocating each software application a set of graphic surface(s) and graphic execution context(s) makes it possible, in other words, to perform a spatial segregation between respective software applications $SW_1$, $SW_2$ during the display of the information relative to each of them, and then to prevent the display of a graphic surface associated with the first software application $SW_1$ from overflowing onto the display of another graphic surface associated with the second software application $SW_2$.

The skilled person will also understand that having a respective overall limit duration $T_1$, $T_2$ for generating the set of graphic surface(s) of each respective software application $SW_1$, $SW_2$ makes it possible to perform a temporal segregation of the generation, then the display, of the graphic surfaces associated with each respective software application $SW_1$, $SW_2$.

In other words, the graphics processor 18 according to the invention makes it possible to offer a temporal and/or spatial segregation of the generation of graphic surfaces associated with respective software applications $SW_1$, $SW_2$, preferably both a temporal segregation and a spatial segregation of this generation, and then to offer safer and more robust partitioning of the display of the graphic surfaces.

One can thus see that the method for generating graphic surfaces and the graphics processor 18 according to the invention make it possible to improve the partitioning of the display of the graphic surfaces associated with the software applications $SW_1$, $SW_2$.

The invention claimed is:

1. A method for generating graphic surfaces to be displayed on a screen, the method being implemented by a graphics processor and comprising:
   generating a first graphic surface to be displayed on the screen;
   switching between generating the first graphic surface and generating a second graphic surface;
   generating the second graphic surface to be displayed on the screen;
   wherein the switching includes:
      saving a graphic execution context of the first graphic surface; and
      if the generation of the second graphic surface had been interrupted during a preceding switch with the generation of another graphic surface, restoring a graphic execution context of the second graphic surface, the restored context having been saved during said preceding switch; and
   wherein each generating step of a respective graphic surface further includes incrementing a respective time counter for each graphic surface, and the switching step further includes saving a value of the time counter of the graphic surface whose graphic execution context is saved.

2. The method according to claim 1, wherein the graphic surfaces are generated for several distinct software applications, and each respective software application is associated with a set of graphic surface(s) and graphic execution context(s).

3. The method according to claim 2, wherein said sets are disjoint from one another; each set including a list of attribute(s) for each graphic surface.

4. The method according to claim 2, wherein a respective overall limit duration is associated with the generation of the set of graphic surface(s) of each software application, and
if the overall limit duration is reached for a respective application during generating a current graphic surface of the set of graphic surface(s) of said respective application, then said generating the current graphic surface is interrupted, and the switching step is done before the generating a subsequent graphic surface of a set of graphic surface(s) of another software application.

5. The method according to claim 1, wherein a respective unitary limit duration is associated with each generating a respective graphic surface, and
if the unitary limit duration for a respective graphic surface is reached, then the generating the respective graphic surface is interrupted, and the switching step is done before the generating a subsequent graphic surface.

6. The method according to claim 5, wherein each graphic surface is associated with a respective generating frequency, and the value of the unitary limit duration of a respective graphic surface depends on the generating frequency of said graphic surface.

7. The method according to claim 1, wherein a maximum refresh time is associated with each respective graphic surface, the value of the maximum refresh time depending on the dimensions of the respective graphic surface, and
if the maximum refresh time is reached for a respective graphic surface during a generating step of said respective graphic surface, then the generating step of the respective graphic surface is interrupted, and the saving of a graphic execution context of said respective graphic surface is not done during the subsequent switching step.

8. The method according to claim 7, wherein the method further comprises emitting an error signal if the maximum refresh time is reached for a respective graphic surface during a generating step of said respective graphic surface.

9. The method according to claim 1, wherein the graphic execution context is positioned in an invalid state, for a later reset.

10. The method according to claim 1, wherein during the switching step, the graphic execution context saved for the respective graphic surface includes at least one information item chosen from the group consisting of:
a rendering library information item;
an information item on a memory location and a memory size of graphic command(s) to be executed for the respective graphic surface; and
an information item of a hardware resource of the graphics processor accessible for the graphic execution of the respective graphic surface.

11. The method according to claim 10, wherein the rendering library information item is chosen from the group consisting of: a color, a line width, a texture, a texture attribute, a list attribute and an alphanumeric attribute.

12. A graphics processor able to generate graphic surfaces to be displayed on a screen, the graphics processor comprising:
a generating module configured to generate respective graphic surfaces to be displayed on the screen;
a switching module configured to switch between generating a first graphic surface and generating a second graphic surface;
wherein the switching module is configured to save a graphic execution context of the first graphic surface; and if the generation of the second graphic surface had been interrupted during a preceding switch with the generation of another graphic surface, then configured to restore a graphic execution context of the second graphic surface, the restored context having been saved during said preceding switch; and
wherein each generating step of a respective graphic surface further includes incrementing a respective time counter for each graphic surface, and the switching step further includes saving a value of the time counter of the graphic surface whose graphic execution context is saved.

* * * * *